March 7, 1961     N. C. PRICE     2,973,621
VARIABLE AREA RAM INLET DEVICE
Original Filed Jan. 23, 1953
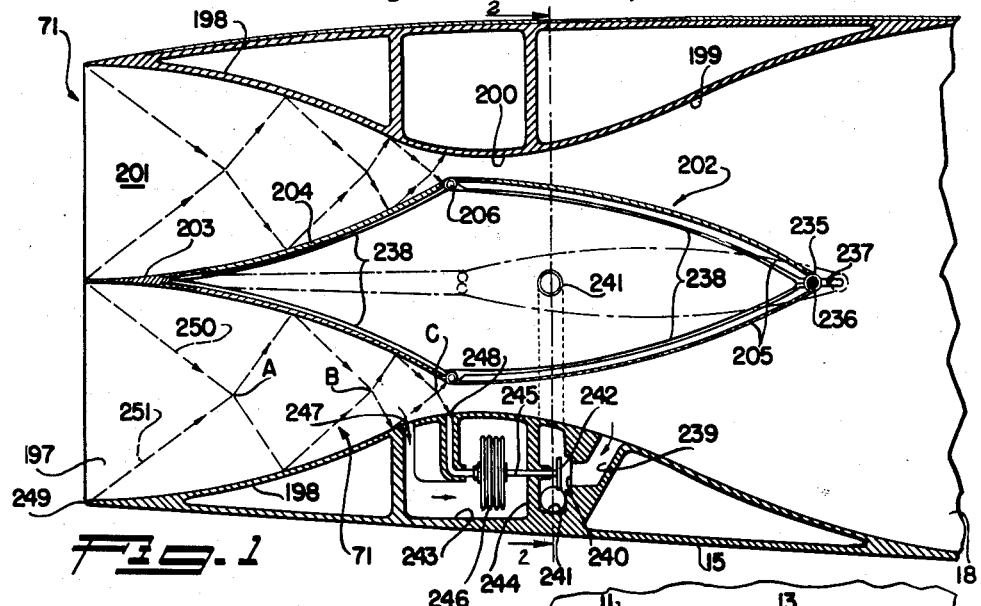
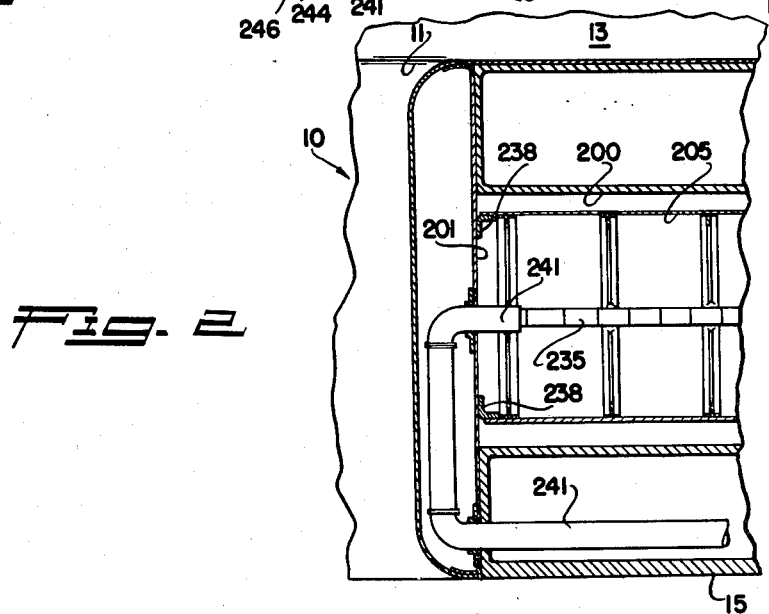
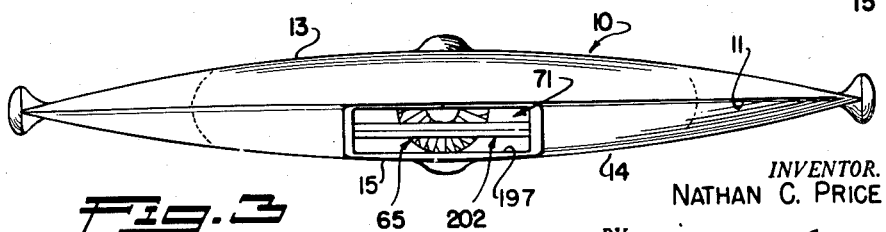
INVENTOR.
NATHAN C. PRICE
BY
Agent United States Patent Office 2,973,621
Patented Mar. 7, 1961

2,973,621

VARIABLE AREA RAM INLET DEVICE

Nathan C. Price, Mexico City, Mexico, assignor to Lockheed Aircraft Corporation, Burbank, Calif.

Original application Jan. 23, 1953, Ser. No. 332,957. Divided and this application July 3, 1957, Ser. No. 669,879

10 Claims. (Cl. 60—35.6)

This invention relates to aircraft propulsive systems, and relates more particularly to the ram inlets of such systems. It is a general object of this invention to provide simple, practical and very effective variable area ram inlet means.

This application is a division of my copending application, Serial Number 332,957, filed January 23, 1953.

Another object of this invention is to provide a variable area ram inlet which automatically operates in response to flight speed and/or flow conditions to be most effective at both subsonic and supersonic speeds of the craft with which it is associated. During subsonic airflow into the ram the inlet or throat thereof is open to the maximum extent, or uncontracted, whereas at supersonic speeds the throat is automatically contracted to a greater or lesser extent to obtain the most efficient supersonic diffuser action.

Another object of this invention is to provide a variable area ram inlet of this character that is generally rectangular and elongated in the normally horizontal position or spanwise to effectively conform with the thin periphery of an aircraft such as disclosed in my copending application Serial Number 332,957 or with the thin or relatively thin leading edge or nose regions of other classes of aircraft, as the case may be, to minimize the frontal area of the craft.

Another object of the invention is to provide a ram inlet device having spaced opposing walls which together define an air inlet passage and means responsive to aerodynamic conditions in the inlet to move one wall with respect to the other and thus vary the operational size or area of the inlet in accordance with the flight speed and/or airflow conditions.

A further object of the invention is to provide a variable area ram inlet characterized by an inflatable island in the inlet air passage which is automatically inflated or enlarged during supersonic flow to more or less restrict the throat of the ram inlet and deflated during sonic flow to increase the operational size or capacity of the inlet. The inflation and deflation of the island which are automatically obtained in response to the operating or prevailing air velocity conditions result in changes in the external configuration of the island to assure aerodynamically efficient contours under all conditions of operation.

Other objectives and features will become apparent from the following detailed description of a typical preferred embodiment of the invention, throughout which reference will be made to the accompanying drawings wherein:

Figure 1 is a vertical sectional view of the ram inlet means of the invention with broken lines and arrows illustrating the shock waves and reflected shock waves;

Figure 2 is a fragmentary vertical sectional view of the ram inlet taken as indicated by line 2—2 on Figure 1; and Figure 3 is a front elevation of an aircraft incorporating the variable area ram inlet of the invention.

The ram inlet means of this invention may, of course, be employed or incorporated in aircraft of various types and is subject to variation to be suited for such applications. In the drawings I have shown a typical inlet means of the invention associated with an aircraft fuselage 10 such as disclosed in my copending application Serial Number 332,957. The fuselage 10 has an upper skin 13 and a lower skin 14 joining one another at a leading edge 11. The fuselage is designed to present a minimum frontal area, being relatively narrow in the vertical direction and extended spanwise. The ram inlet means 71 of the invention is elongated in the spanwise direction and in the particular case illustrated is below the leading edge 11. The inlet 71 has a rectangular opening 197 in its forward end, this opening being bounded at its upper side by the structure of the leading edge 11 and at its lower side by a lower rib 15, the two opposite sidewalls of the opening 197 being generally vertical and parallel. It should be noted that the elongate entrance of the opening 197 conforms generally with the thin forward edge of the fuselage 10 to keep the frontal area of the craft at a minimum.

The ram inlet has a venturi-like throat provided by upper and lower forward wall portions 198 which curve rearwardly and inwardly toward the longitudinal axis of the inlet opening and by rearward upper and lower wall portions 199 which curve forwardly and inwardly to join with the wall portions 198 at a throat 200. The forward wall portions 198 are slightly concave while the rearwardly flaring wall portions 199 are curved and shaped to merge with the walls of the propulsive duct 18 of the aircraft which, in practice, may be cylindrical. The throat 200 presents opposing upper and lower convex surfaces. The end or sidewalls 201 of the ram inlet are preferably flat and vertical, these flat walls extending rearwardly from the forward terminus of the inlet opening 197 to a region at least some distance rearwardly of the throat 200.

The variable ram inlet 71 includes an island 202 of variable volume or variable vertical cross section arranged in the ram inlet opening 197. The island 202 includes a fixed rigid nose 203 extending horizontally or spanwise through the forward end of the opening 197 forming an internal compression inlet. The ends of the nose 203 are anchored at the sidewalls 201 and the nose is thin in vertical cross section to present a forward knife edge and has upper and lower sides diverging slightly from this edge. The island 202 further includes flexible metal walls 204 extending rearwardly from the nose 203 and rigid-material rear walls 205; the flexible walls 204 being slightly resiliently bowed so as to present concave outer surfaces when the aft edges of walls 204 are moved laterally in the inlet passage as explained in more detail hereinafter. Hinge connections 206 join the rear edges of the flexible walls 204 with the forward edges of the rigid-material walls 205. A hinge connection 235 hingedly connects the rear edges of the two rear walls 205 and the pin or pins 236 of this connection are slidable in longitudinal slots 237 in the sidewalls 201 of the opening 197. Seal strips 238 of asbestos cloth, or the like, are secured to the ends of the walls 204 and 205 to engage and seal with the side walls 201 of the opening 197, to reduce or prevent the leakage of fluid pressure from the interior of the island 202. These seal strips 238 are shown in Figure 2 where it will be seen they are arranged and designed to effectively prevent the outward leakage of fluid from the island.

The island 202 constructed and arranged as just described, is adapted to be inflated to a condition such as shown in full lines in Figure 1 to constrict or reduce the effective capacity of the throat 200 for supersonic flow and supersonic diffusion and also for deflation to a condition such as shown in broken lines in Figure 1 to permit large mass flow through the throat 200 during subsonic flow. The inflatable island 202 is responsive to aerodynamic conditions in the ram inlet 71, being automatically inflated or enlarged during supersonic flow to more or less restrict the throat 200 and being deflated during subsonic flow to increase the effective or operational size or cross section of the throat. In accordance with the invention, means for admitting the expanding or inflating air under pressure to the interior of the island 202 is controlled by an air pressure relay means which, in turn, is responsive to the aerodynamic conditions in the ram inlet. The means for admitting air under pressure to the interior of the island 202 includes a port or passage 239 having an open end communicating with the inlet passage 197 aft of the most restricted region of the throat 200. As shown in Figure 1, passage 239 has its open end at one of the walls 199 to receive high pressure air from the diffuser region of the ram inlet passage where a large portion of the kinetic energy of the air is converted into pressure. A valve seat 240 is provided on the wall of the passage 239 and a pipe 241 leads from adjacent the valve seat to one side wall 201 of the ram inlet opening 197 where it communicates with the interior of the island 202, see Figure 2. A movable valve closure 242 is adapted to cooperate with the seat 240 to control the pressure flow through the passage 239. The wall structure of the ram inlet 71 has a chamber 243 separated from the passage 239 by a wall or partition 244 and a stem 245 on the valve closure 242 slidably passes through an opening in this partition to extend into the chamber 243. A diaphragm, Sylphon bellows 246, or the equivalent, has one end anchored in the chamber 243 and has its other end operatively connected with the valve stem 245. The free or unanchored end of the bellows 246 is exposed to and acted upon by air pressure in the chamber 243 which tends to compress or contract the bellows and thus open the valve closure 242. The pressure for effecting this actuation of the diaphragm or bellows 246 is admitted to the chamber 243 by a port or pressure tap 247 communicating with the ram inlet opening 197 some distance forwardly of the region of greatest restriction of its throat 200. Internal pressure in the bellows 246 tends to expand the bellows and move its free end in a direction to close the valve closure 242 against its seat 240. A port or pressure tap 248 supplies this internal pressure to the bellows 246. This pressure tap 248 communicates with the inlet opening or passage 197 in a region downstream from the tap 247 and adjacent the area of greatest restriction of the throat 200 where the final shock waves strike or impinge against the walls of the throat. The broken lines 250 and 251 in Figure 1 represent shock waves originating at the knife edge of the island nose 203 and the marginal lips 249 respectively of the ram opening 197, under supersonic operating conditions. These expansion waves or shock waves 250 and 251 originating at the nose 203 and lips 249 are successively reflected by the walls 198 and 204 so as to repeatedly intersect before reaching the throat 200. In this connection it is to be observed that the walls 198 and 204 are preferably concave so that upon each reflection of a given shock wave from a wall the wave leaves said wall at a lesser angle of incidence. This tends to bring the final shock waves to the region adjacent the tap 248. Further and more important, there is a distinct change in angle of the shock waves 250 and 251 after they intersect. Thus, as seen at the point or line A of intersection of the waves 250 and 251, the angle of the waves has been appreciably changed and been made more oblique to the longitudinal axis of the inlet. Again, at the line B of intersection the waves 250 and 251 travel at more oblique angles to the longitudinal axis of the passage and this is also true at the third line of intersection C. The net result of these several changes of the angles of reflecting and intersecting waves 250 and 251 traveling aft in the inlet passage is the final impingement of the wave 250 against the wall 198 at or adjacent the pressure tap 248. As the wave 250 is a region of increased pressure the impingement of the wave against the wall 198 at the leading edge of the pressure receiving tap 248 produces increased pressure in the bellows 246. Such increased pressure in the bellows 246 tends to move the valve closure 242 toward its seat 240 to reduce the pressure in the island 202 allowing the island to contract by reason of the external forces and pressures acting thereon and thereby increase the area or effective flow path through the throat 200. This is the action of the automatic ram inlet 71 when the island 202 is obstructing the throat 200 to a greater extent than the flow conditions warrant. Conversely when the inflatable island 202 is not, under the prevailing conditions, sufficiently obstructing the flow through the throat 200, the final shock wave 250 will tend to move downstream away from the pressure tap 248 so that the pressure in the bellows 246 is reduced relative to the pressure in the chamber 243 and the valve closure 242 is moved away from its seat 240 to admit additional air pressure into the island 202 to expand the island and thereby further restrict the throat 200. Thus under supersonic flow conditions the island 202 is automatically partially inflated and deflated in response to the aerodynamic conditions in the ram inlet itself to regulate the air flow into the main propulsive air duct 18 and the final oblique shock wave will tend to assume a position of equilibrium with its terminus near the central portion of the tap 248. During subsonic operating conditions the forces and pressures acting on the walls 204 and 205 of the island 202 deflate or collapse the island to a condition such as illustrated in broken lines in Figure 1 where it offers a minimum of obstruction to airflow into the duct 18. It is to be observed that upon inflation and deflation of the island 202 its walls 204 are flexed from the substantially straight or flat condition of the broken lines in Figure 1 to the curved or concave conditions of the full lines, the flexible walls and their nose 203 presenting aerodynamically efficient surfaces under all conditions. The pins 236 are free to slide in the slots 237 during inflation and deflation of the island and it will be noted that the slightly convex walls 205 present smooth aerodynamically efficient surfaces under all conditions. The variable area inlet ram means 71 is self-sufficient and requires no external control means or motive power.

Having described only typical forms of the invention I do not wish to be limited to the specific details herein set forth, but wish to reserve to myself any variations or modifications that may appear to those skilled in the art and fall within the scope of the following claims.

I claim:

1. In an all-internal compression subsonic-supersonic ram air inlet having an inlet lip, the combination of at least two spaced apart confronting walls which together define a passage of fixed inlet area for incoming air, said inlet lip aligned substantially parallel to the incoming airflow, the shape of at least one wall forming a downstream throat to provide a passage of converging-diverging longitudinal cross-section, the confronting surfaces of said walls defining parallel lines in a plane perpendicular to the airflow direction at any longitudinal location through the passage, at least one of said walls being movable toward and away from the other in a direction substantially transverse of the airflow whereby substantially the entire axial extent of the passage longitudinal converging-diverging cross-section is varied during movement of the movable wall, and means for moving the movable wall.

2. In an all-internal compression subsonic-supersonic ram air inlet having an inlet lip, the combination of at least two spaced apart confronting walls which together define a passage of fixed inlet area for incoming air, said inlet lip aligned substantially parallel to the incoming airflow, the shape of at least one wall forming a downstream throat to provide a passage of converging-diverging longitudinal cross-section, the confronting surfaces of said walls defining parallel lines in a plane perpendicular to the air flow direction at any longitudinal location through the passage, at least one of said walls being movable toward and away from the other in a direction substantially transverse of the airflow whereby substantially the entire axial extent of the passage longitudinal converging-diverging cross-section is varied during movement of the movable wall, and means sensitive to aerodynamic conditions within the passage for moving the movable wall.

3. In an aircraft having a duct for receiving external air; a supersonic all-internal compression inlet with inlet lip alignment substantially parallel to the duct axis at the forward end of the duct and having a pair of confronting walls of fixed convergency-divergency in a rearward direction defining a throat, an inflatable and deflatable island located wholly within the duct and extending axially between said walls through the throat, means responsive to the positions of shock waves generated by the inlet for effecting inflation and deflation of the island, said means including a line for conducting pressure from the duct region downstream of the throat to the interior of the island, a valve controlling the line, and means actuated by the increased pressure of said shock waves for operating the valve, said inflation or deflation of the island varying the longitudinal cross-section of the duct throughout substantially the entire axial extent of the island.

4. In an aircraft having a propulsive duct; a ram inlet at the forward end of the duct having rearwardly convergent-divergent walls defining a throat, an inflatable and deflatable island in the inlet including a fixed sharp nose in the forward portion of the inlet, flexible walls diverging rearwardly from the nose to extend into the throat, rear walls hinged to the flexible walls and extending rearwardly therefrom through the throat and pivotally joined at their aft ends, said aft end being axially movable, means for conducting air pressure into the island to inflate the same, and means for controlling the last named means.

5. In an aircraft having a propulsive duct; a ram inlet at the forward end of the duct having rearwardly convergent-divergent walls defining a throat, an inflatable and deflatable island in the inlet including a fixed sharp nose in the forward portion of the inlet, springily flexible walls diverging rearwardly from the nose to extend into the throat, rear walls hinged to the flexible walls and extending rearwardly therefrom through the throat and pivotally joined at their aft ends, said aft ends being axially movable, said flexible walls resiliently bowed to present concave external surfaces in spaced opposing relation to the rearwardly convergent walls of the inlet, means for conducting air pressure into the island to inflate the same, and means for controlling the last named means.

6. In an aircraft having a propulsive duct; a ram inlet at the forward end of the duct having rearwardly convergent concave forward region walls and rearwardly divergent rear region walls joining at a throat, an inflatable and deflatable island in the inlet including a sharp forward nose, springily flexible walls diverging rearwardly from the nose and resiliently bowed to present concave surfaces opposing said concave forward region walls, rear walls hinged to the flexible walls and extending rearwardly through the throat, a hinge connection joining the rear ends of the rear walls, said hinge connection being movable axially to the island, a line for admitting air pressure to the island to inflate the same, a valve controlling the line, and means for controlling the valve responsive to the position of shock waves generated at the inlet and reflected by the concave flexible walls and said concave forward region walls.

7. In an aircraft having a propulsive duct, a ram inlet at the forward end of the duct having rearwardly convergent concave forward region walls and rearwardly divergent rear region walls joining at a throat, an inflatable and deflatable island in the inlet including a sharp forward nose, springily flexible walls diverging rearwardly from the nose and resiliently bowed to present concave surfaces opposing said concave forward region walls, rear walls hinged to the flexible walls and extending rearwardly through the throat, a hinge connection joining the rear ends of the rear walls, said hinge connection being movable axially to the island, a line for admitting air pressure to the island to inflate the same, a valve controlling the line, and means responsive to the position of shock waves generated at the inlet and reflected by the concave flexible walls and said concave forward region walls for controlling the valve, including pressure actuated means for operating the valve, and a pressure tap in the throat communicating with said pressure actuated means positioned to receive the increased pressure where a shock wave impinges against the throat.

8. An air induction device for an aircraft propulsive system comprising a duct having a ram inlet at its forward end, the ram inlet having rearwardly convergent concave forward region upper and lower walls and rearwardly divergent rear region upper and lower walls joining at a throat and being provided with side walls, an inflatable and deflatable island in the duct including a relatively stationary relative sharp nose edge spaced between said forward region upper and lower walls, flexible walls diverging rearwardly from the nose edge to extend into the throat, rear walls articulated with the flexible walls and extending rearwardly therefrom through the throat, means joining the rear ends of the rear walls for relative angular movement, said joining means being movable axially to the island, means conducting air pressure into the island, and means for controlling the last named means.

9. An air induction device for a propulsive system comprising an air duct elongated in transverse cross section and including major rearwardly convergent-divergent walls defining a throat and minor walls joining the margins of the major walls, an inflatable island in the duct including a relatively sharp relative fixed nose edge spaced between the minor walls, flexible walls diverging rearwardly from the nose edge to extend into the throat, rear walls articulated to the flexible walls and continuing rearwardly therefrom to extend through the throat, means joining the rear edges of the rear walls for relative angular movement, said joining means being movable axially to the island, means for conducting fluid pressure to the interior of the island to inflate the same, and means for controlling the last named means.

10. An air induction device for a propulsive system comprising an air duct elongated in transverse cross section and including major rearwardly convergent-divergent walls defining a throat and minor walls joining the margins of the major walls, an inflatable island in the duct including a relatively sharp relative fixed nose edge spaced between the minor walls, springily flexible walls diverging rearwardly from the nose edge to extend into the throat, rear walls articulated to the flexible walls and continuing rearwardly therefrom to extend through the throat, means joining the rear edges of the rear walls for relative angular movement, said joining means being movable axially to the island, said flexible walls resiliently bowed to present with said major walls opposing concave surfaces which define a rearwardly diminishing entrance region of the duct, and means responsive to flow conditions in the entrance region for inflating the island.

(References on following page)

References Cited in the file of this patent

UNITED STATES PATENTS

| | | | |
|---|---|---|---|
| 2,540,594 | Price | Feb. 6, | 1951 |
| 2,551,470 | Smith | May 1, | 1951 |
| 2,596,435 | Robert | May 13, | 1952 |
| 2,631,425 | Nordfors | Mar. 15, | 1953 |
| 2,638,738 | Salter | May 19, | 1953 |
| 2,667,226 | Doblhoff | Jan. 26, | 1954 |
| 2,763,426 | Erwin | Sept. 18, | 1956 |

OTHER REFERENCES

"Aircraft and Missile Propulsion," by Zucrow; vol. I; copyright 1958 by John Wiley and Sons, Inc., chapter 5 relied on, especially pages 385 and 386.